United States Patent
Kürten et al.

(10) Patent No.: US 8,219,102 B2
(45) Date of Patent: Jul. 10, 2012

(54) METHOD FOR INSTALLING A RADIO SYSTEM IN A BUILDING

(75) Inventors: Roland Kürten, Wipperfürth (DE); Andreas Hüschemenger, Waldbröl (DE)

(73) Assignee: Merten GmbH & Co. KG, Wiehl (DE)

( * ) Notice: Subject to any disclaimer, the term of this patent is extended or adjusted under 35 U.S.C. 154(b) by 798 days.

(21) Appl. No.: 12/226,347

(22) PCT Filed: Apr. 18, 2007

(86) PCT No.: PCT/EP2007/053778
§ 371 (c)(1),
(2), (4) Date: Oct. 16, 2008

(87) PCT Pub. No.: WO2007/122159
PCT Pub. Date: Nov. 1, 2007

(65) Prior Publication Data
US 2010/0137012 A1    Jun. 3, 2010

(30) Foreign Application Priority Data
Apr. 20, 2006   (DE) .................. 10 2006 018 281

(51) Int. Cl.
*H04W 40/00* (2009.01)
(52) U.S. Cl. .............. 455/445; 370/395.31; 370/395.32; 370/396
(58) Field of Classification Search .................. 455/41.2, 455/445, 428, 517–519, 41.3, 67.11, 503, 455/515, 574, 127.5, 343.1, 343.5, 436, 437, 455/456; 370/390, 432, 312, 351, 389, 395.31, 370/395.32, 396
See application file for complete search history.

(56) References Cited

U.S. PATENT DOCUMENTS

| | | | |
|---|---|---|---|
| 6,697,333 B1* | 2/2004 | Bawa et al. | 370/238 |
| 6,704,283 B1* | 3/2004 | Stiller et al. | 370/238 |
| 6,934,283 B1* | 8/2005 | Warner | 370/380 |
| 6,977,938 B2* | 12/2005 | Alriksson et al. | 370/401 |
| 6,990,316 B2* | 1/2006 | Heinonen et al. | 455/41.2 |
| 7,177,295 B1* | 2/2007 | Sholander et al. | 370/338 |
| 7,349,360 B2* | 3/2008 | Gutierrez et al. | 370/315 |
| 7,454,494 B1* | 11/2008 | Hedayat et al. | 709/224 |

(Continued)

FOREIGN PATENT DOCUMENTS
DE   601 08 946 T2   12/2002
(Continued)

OTHER PUBLICATIONS

De Couto et al. "Performance of Multihop Wireless Networks: Shortest Path is Not Enough"; vol. 33, No. 1, Jan. 2003.

(Continued)

*Primary Examiner* — Dominic E Rego
(74) *Attorney, Agent, or Firm* — Miles & Stockbridge P.C.; David R. Schaffer, Esq.

(57) ABSTRACT

A radio system is installed in a building, wherein each terminal (T) communicates with neighboring terminals and can transmit telegrams. The terminals (T) are contained in devices or installed as separate mobile terminals. A routing table is created, in which each acceptable route from a source (Q) to a destination (Z) is entered. Connection from source to destination is evaluated with consideration of the number of hops from terminal to terminal within a route, and of the availability of unique individual sections (SES) that cannot be replaced by a parallel path.

4 Claims, 2 Drawing Sheets

U.S. PATENT DOCUMENTS

| | | |
|---|---|---|
| 7,532,629 B2 * 5/2009 | Ebata | 370/401 |
| 7,616,575 B2 * 11/2009 | Padhye et al. | 370/238 |
| 7,724,670 B2 * 5/2010 | Nilakantan et al. | 370/235 |
| 2002/0122410 A1 * 9/2002 | Kulikov et al. | 370/349 |
| 2003/0231599 A1 * 12/2003 | Umezawa | 370/255 |
| 2005/0154790 A1 * 7/2005 | Nagata et al. | 709/223 |
| 2007/0041345 A1 * 2/2007 | Yarvis et al. | 370/331 |
| 2007/0064697 A1 * 3/2007 | Nesbitt et al. | 370/392 |
| 2008/0310340 A1 * 12/2008 | Isozu | 370/328 |
| 2009/0052895 A1 * 2/2009 | Oki et al. | 398/45 |
| 2009/0274128 A1 * 11/2009 | Zhang et al. | 370/338 |
| 2010/0238866 A1 * 9/2010 | Sendrowicz | 370/328 |

FOREIGN PATENT DOCUMENTS

| | | |
|---|---|---|
| EP | 1 617 608 A1 | 1/2006 |
| WO | WO 2005/062554 A1 | 7/2005 |

OTHER PUBLICATIONS

Draves et al. "Comparison of Routing Metrics for Static Multi-Hop Wireless Networks"; Bd. 34. No. 4; Oct. 2004.

* cited by examiner

| SubDevice actors / SubDevice sensors | actor 1.1 | actor 1.2 | actor 2 | actor 3 | actor 4 | actor 5.1 | 5.2 |
|---|---|---|---|---|---|---|---|
| Sensor 1 | gr | | | gr | | | |
| Sensor 2.1 | | | | | | | gr |
| Sensor 2.2 | | gr | yel | | | | |
| Sensor 3 | | | | | | | bl |
| Sensor 4.1 | | | | | gr | | |
| Sensor 4.2 | | | yel | | | | |
| Sensor 5 | | | | | | red | |

METHOD FOR INSTALLING A RADIO SYSTEM IN A BUILDING

BACKGROUND OF THE INVENTION

The invention refers to a method for installing a radio system in a building, wherein individual sections are formed between the terminals of the radio system that may be combined into different routes for connecting a respective source with a destination, comprising the following steps:
    determining the quality of the radio link of the individual sections, and
    establishing and storing a routing table which stores at least one route for each combination of source and destination.

Building control systems are known wherein data communication and remote control can be performed within a building and data or commands are transmitted from a source to a destination, respectively. Such systems generally use a bus installed in the building, which is adapted to transmit bus telegrams. A known bus system is the EIB bus. A bus system implies the installation of wired bus lines in the building. This requirement is often hard to satisfy.

A wireless radio system is described in DE 601 08 946 T2 (Zensys). This radio system comprises distributed terminals, each adapted for wireless communication with each other, wherein, however, the communication range is limited. The terminals are arranged such that each terminal can communicate with at least one other terminal. Individual sections are formed between two neighbouring terminals. A plurality of individual sections may be combined to form a route, wherein the acceptable routes are stored in a routing table. Defining the routes is done with the help of a controller or a control means in which the network topology is stored. Each of the terminals has a transmitter and a receiver. The controller can communicate with any terminal. To this avail, the terminals are provided with unique identification codes and may be called individually. The terminals are differentiated into routing slaves that include a partial topology map and can not calculate routes, and slaves that include no topology maps. Both the routing slaves and the slaves act as repeaters that are able to pass on a message received. All radio links are bidirectional.

SUMMARY OF THE INVENTION

It is an object of the present invention to provide a method for installing a radio system that allows a technician to set up the radio system according to the quality of the individual sections such that a maximum degree of reliability of the radio links is achieved.

An evaluation of the link between a source and a destination is done with consideration to the following criteria:
    a) the number of hops from terminal to terminal within a route,
    b) the presence of unique individual sections that can not be replaced with a parallel path.

Routing tables exist within the radio system, in which the acceptable routes between the different terminals are stored. Using these routing tables, the link is set up between one of the terminals as the source (sensor) and another terminal as the destination (actor). All necessary individual sections and routes within a link are evaluated by different criteria.

The criterion a) is of importance in the evaluation. This means that the number of hops per route is kept as low as possible. A route that requires fewer hops than another route is preferred.

Unique individual sections present a risk, since there exist no alternative routes to these links in this region. Therefore, unique individual sections are also included in the evaluation.

The evaluation may additionally include the following criteria, either individually or cumulatively:
    c) the communication quality of the routes and individual sections,
    d) the number of the individual sections available from the source (points of entry),
    e) the number of the available individual sections leading to the destination (exit point).

Preferably, all criteria a)-e) are included in the evaluation. The criteria may be accorded weightings and the weighted results may be added, whereby a parameter for the link between the source and the destination is determined.

The following is a detailed description of embodiments of the invention with reference to the drawings.

DETAILED DESCRIPTION OF THE PREFERRED EMBODIMENTS

FIGS. 1-4 respectively illustrate different so-called interconnected radio systems, whose terminals T are each formed by a combination of a transmitter and a receiver. The terminals T are distributed across a building and form a terminal network, wherein the terminals T are adapted for wireless communication. Each terminal is provided with an individual identification ID that is unique so that the terminals can be addressed.

The terminals T are generally provided in combination with devices. The devices are mainly differentiated into sensors and actors. For example, a sensor is an electric button or switch, whereas an actor is an actuating element that causes an electric function in response to an electric signal, such as the switching-on of an electric device, a valve and the like. Besides sensors, such as buttons and switches, further devices equipped with the terminals T are actors such as solenoids, for example drives for garage doors, louvers, or household appliances such as laundry machines or ovens, for example.

Figure 1:
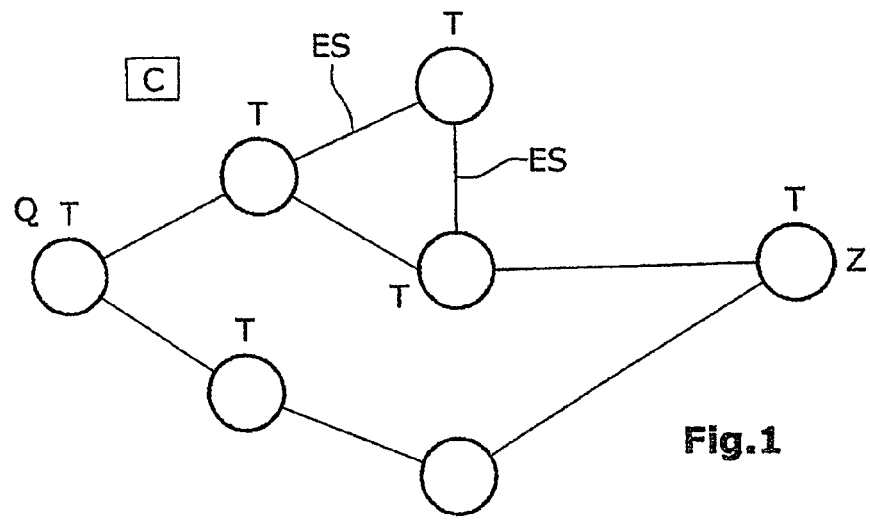
FIG. 1 illustrates a first network of individual sections formed between neighbouring terminals of a radio system, wherein routes can be assembled from the individual sections.

For an information to be communicated, one terminal acts as the source Q and another acts as the destination Z. the identification codes of the source Q and the destination Z are communicated to the controller C, which will take the most favourable route connecting the source and the target from a routing table stored therein. This route is composed of one or a plurality of individual sections ES. An individual section is a radio link that connects two neighbouring terminals T directly (FIG. 1).

In the context of the installation work, the radio links between functionally related terminals (sensor/actor) are evaluated, wherein the best communication quality and the highest communication reliability are searched for according to fixed criteria.

If a terminal can not be reached by the radio system with sufficient reliability, e.g. because this terminal is installed in the garage or the basement, the technician may install a further terminal merely formed by a transceiver unit so as to link the terminal hard to reach to the radio system. On the other hand, he may also reposition the terminal hard to reach and look for alternative positions so as to improve the availability of the terminal.

The measurement of the signal qualities between the terminals T is initiated by radio through the controller C. The controller C appoints a respective routing slave as a radio node, in order to measure the availability of a second radio node. The second radio node acknowledges this attempt by transmitting its identification code.

Figure 2:
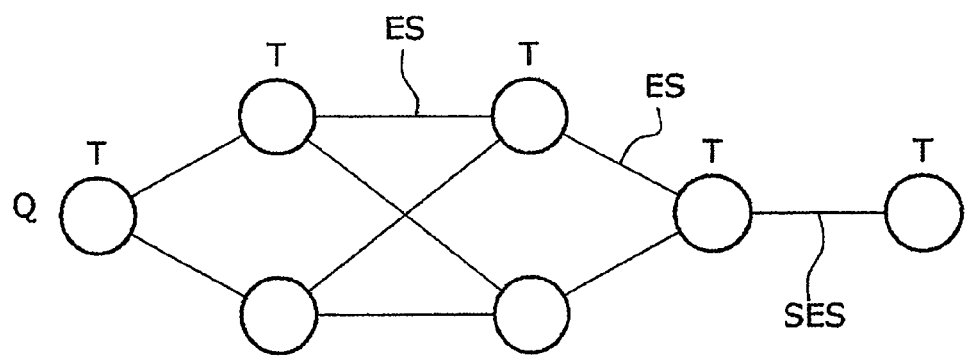
FIG. 2 shows a second example of a radio system.

FIG. 2 illustrates a detail of another radio network, wherein a source Q is to be linked to a destination Z as well. The route is assembled by stringing together individual sections ES. The last individual section before the destination Z is a unique individual section SES, i.e. an individual section that can not be replaced with a parallel path. All other individual sections ES may be replaced with other routes.

Figure 3:
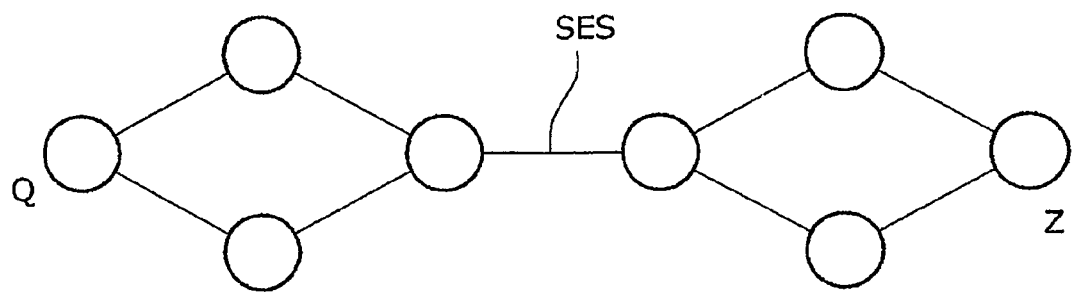
FIG. 3 shows a third example of a radio system.

FIG. 3 show an example of another network or detail of a network, wherein a unique individual section SES is situated in the central portion of the routes between the source Q and the destination Z.

Figures 4, 5:
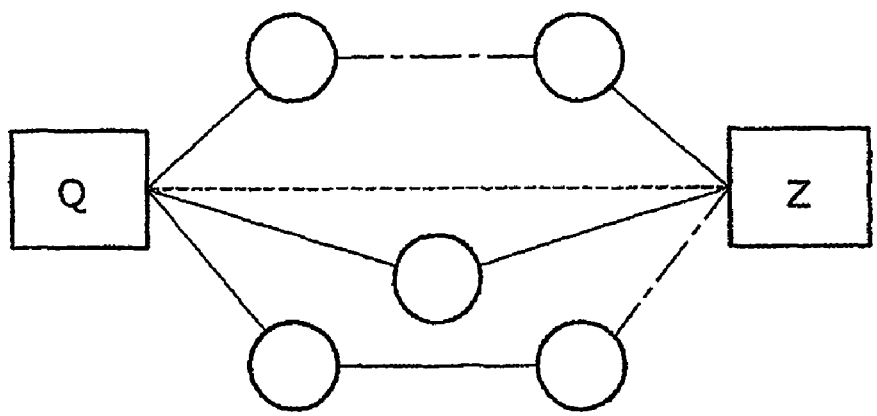
FIG. 4 shows an example of the representation of the quality of the individual sections.
FIG. 5 shows an example of the representation of the quality of the routes in a networked radio system.

FIG. 4 illustrates a route map of four different routes that lead from a source Q to a destination Z. The continuous lines represent good links, the broken line represents a satisfactory link and the chain-dotted lines represent respective poor links. The illustration in FIG. 4, with the quality of the links being identified by different colours. In this manner, the technician has an immediate overview of the route qualities. The individual sections or routes may also be classified in percentages or as school grades (1-6).

The following table 1 is an exemplary illustration of the evaluation of a link from a source to a target based on the individual criteria.

A quality of 50% is fixed for the sections of the points of entry determined.

As a further criterion, the number of unique individual sections SES is considered and, finally, another criterion to be taken into account is the number of exit points, i.e. the number of individual sections that each lead directly to the destination Z.

The rating of the individual criteria is obvious from table 1, as well as the weighting accorded to these criteria.

The evaluation of a link between a source and a destination results from the sum of the weighted results of the individual criteria in table 1.

The following table 2 indicates the evaluation of the link between the source and the destination by the sum of the total number of points. With this evaluation, possible necessary adaptations may be effected on the installation side.

TABLE 2

| | | |
|---|---|---|
| 0 | no connection | bl. |
| 1 ... 100 | poor connection | red |
| 101 ... 200 | satisfactory connection | yel. |
| 201 ... 300 | good connection | gr. |

The route diagram of FIG. 4 is not suited to illustrate an entire network. For this purpose, the table in FIG. 5 is chosen. The table lists all nodes (terminals) forming a part of the system. At the crossings, the quality of the function is indicated. Here, "gr." (green) identifies a route with a good connection, "yel." (yellow) stands for a route with a satisfactory connection, "red" (red) identifies a route with a poor connection and "bl." (black) indicates a route where "no connection" can be established.

The routing table of the system is updated by testing the links of the routing slaves anew. The controller C as the radio configuration tool causes each routing slave to determine its link to the other routing slaves. This is done at 100% trans-

TABLE 1

| Quality level | Points | Number of points of entry | Routes with x hops | | | | Result of individual section measurement | Unique sections | Exit points (e.g. for DC actors) |
|---|---|---|---|---|---|---|---|---|---|
| | | | 0 | 1 | 2 | >3 | | | |
| Good | 3 | >2 | >1 | >1 | >2 | >3 | 51-100 | 0 | >2 |
| Satisfactory | 2 | 2 | 0 | 1 | 1-2 | 2-3 | 26-50 | 1 | 2 |
| Poor | 1 | 1 | — | 0 | 0 | 0 | 1-25 | >1 | 1 |
| Non existent | 0 | 0 | — | — | — | — | 0 | — | 0 |
| Weighting % | | 30 | 20 | 7 | 2 | 1 | 15 | 20 | 5 |

In this table, the number of points of entry indicates the number of individual sections that lead from the source Q to the destination Z via the network. In the embodiments of FIGS. 1-3, the number of points of entry is "2", respectively. The hops indicate the hops or the number of terminals T included as intermediate points in a route. In the measurement of individual sections of the terminals in the routes determined, the communication quality of the individual links concerned is evaluated. The quality of the link from a source to a destination is calculated from the qualities of the individual sections as follows:
- within a route, the weakest individual section is decisive for the overall route,
- among the alternative routes, the best overall route has to be used for the link between the source and the destination.

mission power. Each routing slave is tested against each other routing slave. The respective routing slave is ordered to check the availability of a certain other routing slave. This process updates the routing table of the system in the controller and may be read upon completion of the process.

The radio configuration tool with the controller C is connected at a final installation site, preferably through a USB interface, so that a manual measurement in an undefined space can be omitted.

What is claimed is:
1. A method for installing a radio system in a building, wherein individual sections are formed between the terminals of the radio system that may be combined into different routes for connecting a respective source with a destination, comprising the following steps:

determining the quality of the radio link of the individual sections, and establishing and storing a routing table which stores at least one route for each combination of source and destination, wherein an evaluation of the link between a source and a destination is done with consideration to the following criteria:
- a) the number of hops from terminal to terminal within a route,
- b) the presence of unique individual sections that can not be replaced with a parallel path wherein the criteria are provided with weightings and the weighted results are added, whereby a parameter for the link from the source to the destination is provided, and wherein the numbers of hops have individual weightings, wherein the weighting of a route increases with decreasing number of hops.

2. The method of claim 1, wherein the evaluation includes the following criterion:
- c) the communication quality of the routes and individual sections.

3. The method of claim 1, wherein the evaluation includes the following criterion:
- d) the number of the individual sections available from the source (points of entry).

4. The method of claim 1, wherein the evaluation includes the following criterion:
- e) the number of the available individual sections leading to the destination (exit point).

* * * * *